Patented Nov. 22, 1938

2,137,815

UNITED STATES PATENT OFFICE 2,137,815

ALKYL SUBSTITUTED PYROGALLOL

Frits E. Stockelbach, Montclair, N. J.

No Drawing. Application July 2, 1937,
Serial No. 151,667

3 Claims. (Cl. 260—625)

Pyrogallol and its alkyl substituted products as a class are known as powerful reducing agents in both neutral and alkaline solution, and I have disclosed in my issued patent, No. 2,037,742, that a specific group of these compounds have certain desirable properties which render them particularly useful in photographic developers. Included in said specific group compounds is mono tertiary butyl pyrogallol, which substance, so far as I am aware, is nowhere mentioned in chemical literature, and to the best of my knowledge and belief is a new compound.

In further experimenting with this mono tertiary butyl pyrogallol compound I have found that it is also very effective as an anti-oxidant for gasolene, transformer oils, etc., when added thereto.

Mono tertiary butyl pyrogallol may be prepared by condensing pyrogallol with tertiary butyl alcohol, using one of the usual condensing agents such as zinc chloride. After the condensation is completed the reaction product is shaken out with a solvent such as toluol, allowed to crystallize, and finally purified by distillation under high vacuum and crystallization from water. When crystallized from water it forms white crystals having a melting point of 138°–139.2° C. which are readily soluble in water and organic solvents.

When a drop of dilute ferric chloride is added to an aqueous solution of mono tertiary butyl pyrogallol it produces a light purple color which quickly disappears. If, following this, a drop of a dilute solution of sodium carbonate is added, a deep violet color is produced. A silver nitrate solution is reduced instantaneously by adding a few drops of the aqueous solution of mono tertiary butyl pyrogallol thereto.

Specifically, mono tertiary butyl pyrogallol may be prepared as follows:

In a flask provided with an agitator there are mixed 400 grams pyrogallol, 300 grams tertiary butyl alcohol and 300 grams fused zinc chloride, and the mixture heated with vigorous stirring. At 70° C. a vigorous reaction sets in accompanied by considerable foaming, at which point external cooling may be necessary. After the reaction has subsided the mixture is heated to 120° C. and maintained there for about an hour. The product is then cooled to room temperature, 300 cc. of distilled water added thereto and the butyl pyrogallol extracted with ether. The ether extract is washed twice with 300 cc. of water containing a few drops of hydrochloric acid and the ether is finally distilled off, the last traces thereof being removed under vacuum. The crude tertiary butyl pyrogallol is then purified by distillation under vacuum and boils at 165°–170° C. at 2 to 3 mm. pressure. The yield of distilled mono tertiary butyl pyrogallol will be approximately 500 grams. This distilled product may be further purified by crystallization from water in which, when hot, it is readily soluble, but, when cold, only soluble to the extent of from 3%–4%.

What I claim is:

1. The process of producing mono tertiary butyl pyrogallol which comprises reacting an excess of pyrogallol with tertiary butyl alcohol and fused zinc chloride as the condensing agent, the tertiary butyl alcohol and the zinc chloride being used in substantially equal quantities.

2. The condensation product of pyrogallol with tertiary butyl alcohol in which the tertiary butyl radical is attached to the pyrogallol nucleus.

3. The chemical compound mono tertiary butyl pyrogallol, said compound being a white crystallized substance having a melting point of 138°–139.2° C. which is readily soluble in hot water.

FRITS E. STOCKELBACH.